INVENTORS
RULON G. SHELLEY
JAMES C. ELMS

BY

ATTORNEY

United States Patent Office 3,075,188
Patented Jan. 22, 1963

3,075,188
STABLE OPTICAL TRACKING FIRE
CONTROL SYSTEM
Rulon G. Shelley, Downey, Calif., and James C. Elms,
Englewood, Colo., assignors to North American Aviation, Inc.
Filed Apr. 17, 1959, Ser. No. 807,104
6 Claims. (Cl. 343—7)

This invention relates to fire control systems, and particularly to an optical sight system used in combination with a director utilizing radiant energy detection means to compute the proper course for an attacking airplane to fly in order that it may deliver fire most quickly and accurately against a target.

In practicing the invention, the pilot steers his plane to keep a reticle image continuously alined with the target which he is observing through his windshield. The invention combines the superior tracking ability of the director system with the more realistic presentation of the disturbed-line optical sight to obtain the advantages of both.

Certain types of fire control systems now employed in fighter airplanes use "disturbed line" optical sight arrangements, such as that described in Patent Number 2,467,831, issued April 19, 1949, F. V. Johnson, inventor, in which the optical reticle is displaced, or "disturbed off," into the proper lead angle by the computer as the pilot steers the aircraft to keep the reticle on the target. This mode of operation, as a fundamental consequence of the method of computing a lead angle, inserts a net phase lag into the pilot-airframe feedback loop, thus destabilizing it.

Experience has shown that tracking accuracy in air-to-air operation deteriorates under stress of combat when disturbed-line systems are used, because of the basic mechanization, in which the prediction is a function of the pilot-airframe response. By contrast, the director mode prediction, in which all computations are made in terms of the existing instantaneous values available from the attacking plane's instrumentation, is a function of target line motion only and therefore is less influenced by the dynamics of the pilot and the airframe.

Present "interceptor" type fire control systems consist of a self-tracking radar and a director-type fire control computer. The presentation to the pilot consists of a steering dot on a display tube which the pilot centers or zeros by steering the airplane. Such a system is described in Patent Number 2,616,625, issued November 4, 1952, R. H. Griest et al., inventors. The prediction dynamics are outside the pilot-airframe loop and therefore do not affect its stability. The ability of the interceptor system to track a target, utilizing a director, is theoretically better, because the prediction method is divorced from the pilot-airframe dynamics.

However, the director system suffers from the fact that the presentation of steering information is less realistic than that with the optical sight. The sense of reality and the anticipation afforded by viewing the target directly, and steering to place the reticle on it, is lost in present interceptor systems. Hence the steering accuracies with director systems are not as improved over disturbed line systems as might be expected.

In this invention, steering information is made available to the pilot optically by subtracting the computer error signal from the radar line-of-sight position and presenting this information visually. The system may be used by projecting the image of the displaced sight-head reticle on the windshield through which the pilot is watching the target. He flies the fighter so as to superimpose the image of the sight-head reticle on the target. When he has done so, the computer error signal is zero, at which time the plane is flying a lead pursuit course. Thus by flying the fighter so that the image of the reticle continues to be superimposed on the directly observed target, which is the usual practice in optical tracking, the pilot is steering the plane on an accurately computed lead pursuit course. He may then fire continuously at any point along the flight path within the range of his armament and expect to score hits.

It is therefore a primary object of this invention to improve the ease and accuracy of operation of pursuit and interceptor aircraft.

A further object is to make more graphic the visual presentation to a pilot of his situation relative to a target craft, while retaining the advantages of director type operation, which utilizes the superior equation solving ability of electronic computing equipment.

Another object is to combine the accuracy of director-type operation with the more pictorial representation to the pilot of the optical sight or disturbed line system.

A still further object is to improve the response characteristics of a plane being flown with disturbed line-of-sight guidance.

Another related object is to enable a pilot to supplement the operation of a director-controlled autopilot with his immediate personal responses to rapidly changing situations.

Yet a further object is to provide an improved system for controlling a pursuit aircraft which does not require that a pilot trained to use an optical sight learn a new operating technique.

Another object is to provide an improved system for guiding pursuit aircraft which can be readily operated by pilots familiar with existing optical systems without requiring extended additional training.

These and other objects of this invention will become apparent from the following description taken in conjunction with the accompanying drawings, in which.

Figure 1:
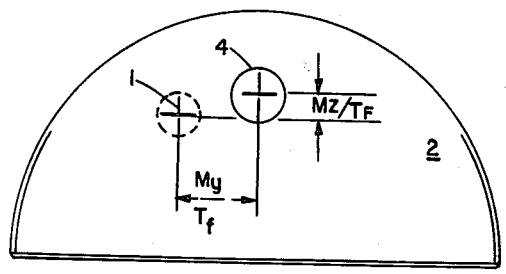
FIG. 1 is a representation of the target as seen by the pilot, looking forward through the windshield of the pursuit plane, together with the image of the reticle projected on the windshield from the sighthead.
Figure 3:
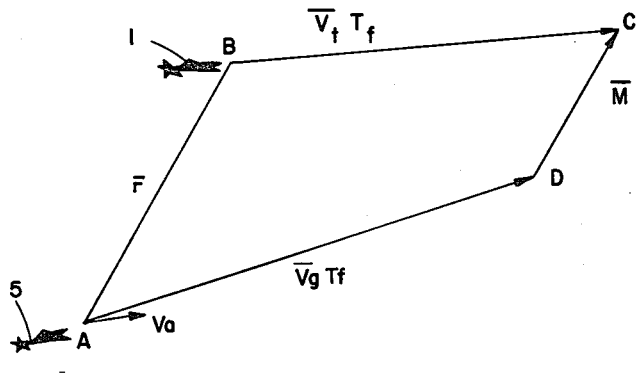
FIG. 3 is a diagram showing in simplified form the relations between a pursuit aircraft and its target.

The presentation to the pilot has been illustrated in FIG. 1 as it appears to him when he is visually tracking a target under terminal conditions, when his plane is approaching a target, as shown in FIG. 3. He sees the target 1 through his windshield 2. An image 4 is projected on the windshield from the sight head reticle, not shown in the figure, and he steers his plane 5 so as to place that image directly over the target. When he has done this, he knows that he is flying the correct lead pursuit course, and he may fire at will, with the assurance of hitting the target 1 if it is within the range of his weapons system.

When not operating under visual terminal conditions, he may, of course, approach the target with the aid of an equivalent display on a conventional cathode ray oscilloscope, not shown.

The apparent vertical and horizontal displacements between the reticle image 4 and the visually observed target 1 are directly proportional to the expressions $$\frac{M_z}{T_t}$$

and $$\frac{M_y}{T_t}$$

where $M_z$ and $M_y$ are components along the $z$ and $y$ axes of the miss distance $\overline{M}$, and $T_f$ is the time of flight to explosion. These values, the derivation of which will be considered later, are solved for in the computer, and delivered as positioning instructions to the servo controlled sight head which projects the reticle image 4 on the wind screen.

Under conditions of reduced visibility, these values may also be presented as command signals instructing the pilot to change the plane heading by so many degrees in azimuth and in elevation.

In the diagrammatic showing of FIG. 3, the attacking plane 5 is shown as flying along a course heading from A to D, reaching point A at the time of firing. At this instant, the target plane is shown at point B. The target plane is assumed to continue at a constant rate of speed, $V_t$, on a fixed course from B to an anticipated impact point C during the flight of the ammunition. The distance from point B to point C may then be represented as the product of $\overline{V}_t$ by the time to impact $T_f$, or $\overline{V}_t T_f$.

After firing its ammunition at point A, the attacking plane 5 may vary its course at will. Let us assume that the initial heading of the ammunition is not exactly toward the anticipated impact point C, but is toward an actual explosion point D. The ammunition will travel on course heading AD, with the velocity due to its own propulsive force increased by a component due to the velocity of the pursuit plane at firing. Denoting the overall velocity to the actual explosion point D as $\overline{V}_g$, representing the vectorially combined velocities of plane 5 and the fired ammunition, the distance to point D may be represented as the product of this quantity $\overline{V}_g$ by the same time interval, $T_f$, as that during which the target is traveling to the anticipated impact point C.

If, as we have assumed, the actual explosion point D does not exactly coincide with the predicted impact point C, the vectorial difference between point C and the actual explosion point D may be represented by the miss vector, $\overline{M}$.

The miss vector $\overline{M}$ may then be used as a common element between equations expressing the motion of the target and equations representing the motion of the pursuit plane, input data for which is obtained from two independent systems. By suitable servo arrangements the course of the pursuit plane and the direction in which the armament is to be fired may be altered until the miss vector has been brought to zero. When this has been accomplished, the pilot may fire at will and expect to score direct hits up to the limit of the range of his armament.

Figure 4:
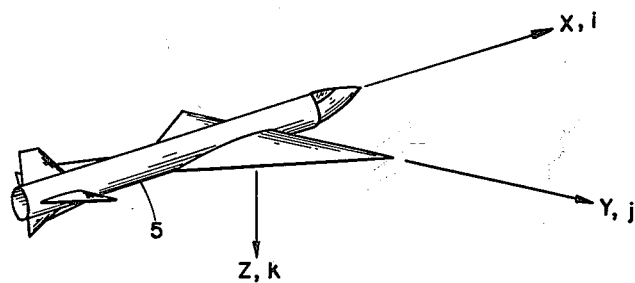
FIG. 4 is a diagram showing the axes of the plane and radar coordinate systems.
Figure 5:
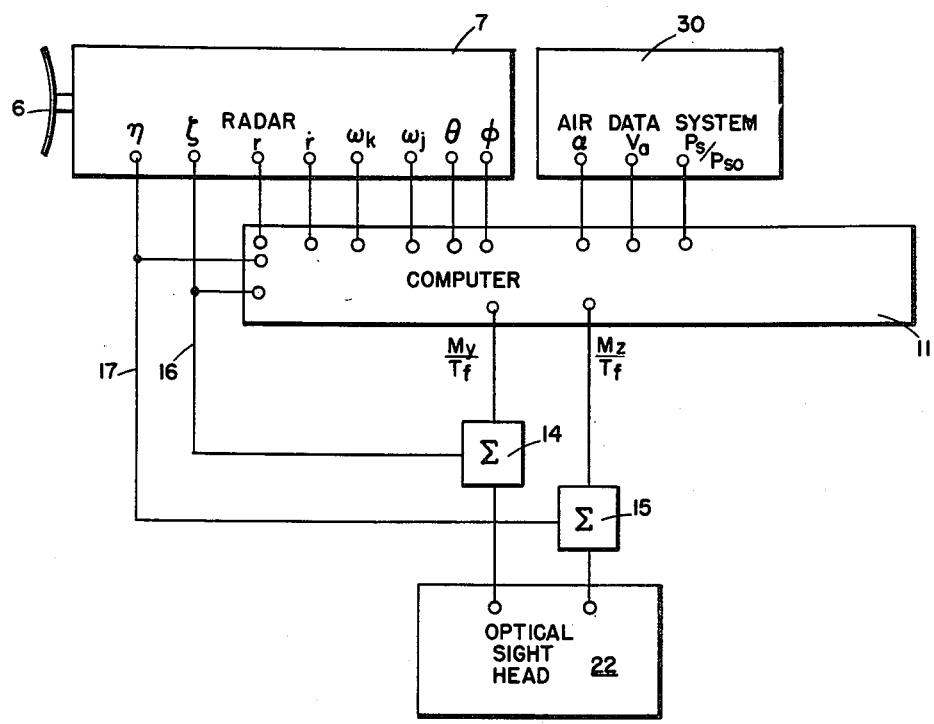
FIG. 5 is a schematic diagram showing in greater detail the relations between the elements of a preferred embodiment of the invention.

The mathematical relations by which the value of the miss vector may be used as the common element between information derived from the plane's radar and that from other equipment will next be discussed, with relation to FIGS. 3–5. It is convenient to represent these relations in terms of vector geometry.

Part of the information is received at the attacking plane in airplane coordinates, and part in the coordinates of the antenna system, and the appropriate data must be transformed by the system from one set of these coordinates to the other to achieve a complete solution.

The frame of reference for the aircraft consists of mutually perpendicular $x$, $y$, and $z$ axes. The $x$-axis is conventionally taken as positive looking forward out of the nose of the plane, the $y$-axis as extending positively out the right wing, and the $z$-axis as being positive downward, as shown in FIG. 4. The $x$-axis may thus be considered as the longitudinal axis of symmetry of the plane. The radar system axes, which may have their origin or origins displaced from that of the plane system, include mutually perpendicular $i$, $j$, and $k$ axes corresponding approximately to the $x$, $y$, and $z$ axes of the latter. In this showing, for simplification, the assumption has been made that the radar antenna is caged on the armament datum line, which is taken as coincident with the longitudinal axis of symmetry. Spatially fixed reference means may be obtained by using gyroscopically controlled stable platforms of types known in the art.

In carrying out the operations in the predication and ballistics portions of the computer, structure and techniques have been used such as those described in U.S. Patent Number 2,933,980 entitled "Integrated Aircraft Fire Control Autopilot," issue date April 26, 1960, inventors John R. Moore and David G. Soergel, and assigned to the assignee of the instant case. Reference is hereby made to that patent for the details of exemplary structure not necessary to be repeated in this application, although it will of course be understood that the present system is complete in itself and is not intended to be used with an autopilot of the type there disclosed.

Attention is also invited to the description of a "Vector Filter System" in U.S. Patent 2,805,022, issued September 3, 1957, to one of the joint inventors of the instant disclosure, Rulon G. Shelley, and assigned to the assignee of the present application. That patent explains the system for smoothing the radar input signals, and it is to be understood that such a system may be incorporated in and utilized with the present disclosure.

Figure 2:
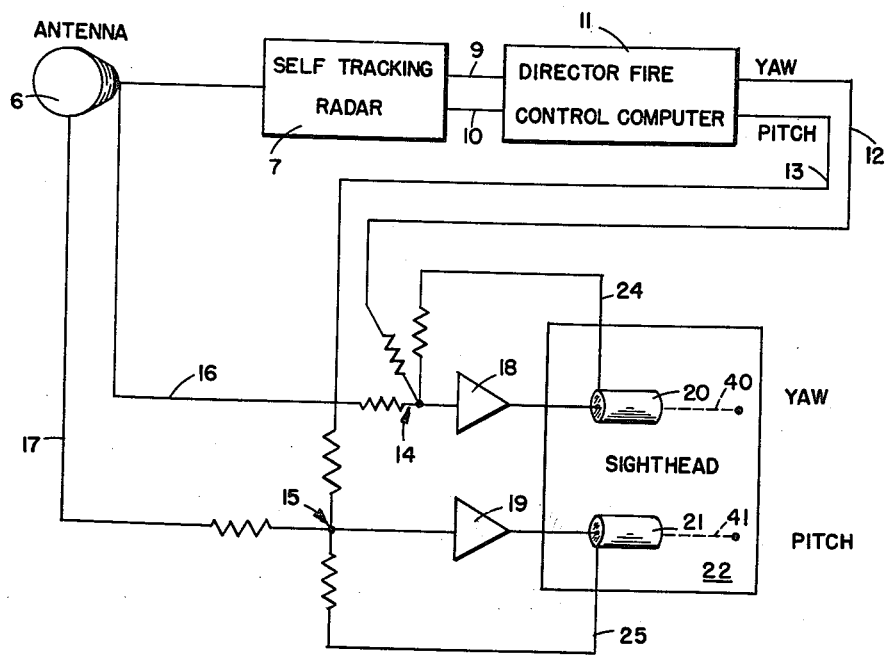
FIG. 2 is a schematic diagram of the invention.

In FIG. 2 a schematic simplified diagram of the system has been shown in which a radar antenna 6 is arranged to receive echo signals and transmit them to the self-tracking radar 7, which automatically controls the position of the antenna 6 in azimuth and elevation, keeping it locked on the target. Data from the self-tracking radar 7 is furnished through suitable leads 9 and 10 to a director type fire control computer 11. It will be understood that this system is equally applicable to use with other forms of radiant energy detection systems, as, for example, those using the infrared range of the electromagnetic spectrum.

The fire control computer, with the aid of additional data received from elsewhere in the system, as described later, furnishes yaw and pitch signals through leads 12 and 13 respectively to summing networks 14 and 15 respectively, where corrections are inserted through leads 16 and 17 for the antenna gimbal angles $\eta$ and $\zeta$, which represent the angular differences due to the displacement of the radar antennae from the longitudinal axis of symmetry of the plane. Networks 14 and 15 feed amplifiers 18 and 19, respectively, delivering corrected yaw and pitch signals to the positioning servo members in the sighthead. The yaw servo controller 20 and the pitch servo controller 21 have their respective output shafts 40 and 41 coupled to drive sighthead 22 and thus are effective in positioning the sighthead 22 continuously in accordance with the computations of the fire control computer 11 as combined with the antenna gimbal angles.

A portion of the servo signals is fed back through yaw feedback lead 24 and pitch feedback lead 25 to the summing networks 14 and 15 in order to obtain smoother operation.

The sighthead 22 is arranged to project the reticle image 4 on the windshield 2 as seen in FIG. 1, through conventional optical means, not shown in the figure. As explained above, the pilot steers the plane in such a way as to superimpose this image 4 on the actual target as seen at 1. When he has done so he knows that he may fire at will and expect to hit the target, since all of the computations necessary to properly direct his armament have been taken care of automatically by the fire control computer 11, and are thus incorporated into the projected position 4 of the sighthead reticle.

In the discussion which follows the following symbols will be used:

$T_f$ is the time of flight of the ammunition to the anticipated impact point with the target, and is assumed to be equal to the time of flight of the ammunition to the actual explosion point;

$V_f$ represents the velocity of the fighter, or attacking airplane;

$V_0$ represents the velocity of the ammunition relative to the fighter plane;

$V_g$ is the sum of the velocity components in the direction of firing due to the ammunition and to the attacking plane;

$V_t$ is the velocity of the target;

$r$ represents the radar range;

$\bar{r}$ represents the radar range in vectorial form;

$\dot{\bar{r}}$ represents the vectorial rate of change of range, and is equal to $\bar{V}_t$ minus $\bar{V}_f$;

$\omega$ is the rate of change of the line of sight to the target, in radians/second;

$\bar{M}$ is the miss distance in vectorial form;

$i$, $j$, and $k$ are the antenna coordinates;

$x$, $y$ and $z$ are the plane coordinates;

$V_a$ is the heading of the attacking plane at the time of firing;

$\eta$ is the radar elevation gimbal angle;

$\zeta$ is the radar azimuth gimbal angle;

$P_s$ is static pressure of the air at fighter altitude;

$P_{s0}$ is static pressure of the air at sea level;

$\theta$ is the fighter pitch angle;

$\phi$ is the fighter roll angle; and $\alpha$ is the angle of attack, or difference between the direction of the aircraft boresight and that along which the velocity vector of the fighter is computed.

Referring now to FIG. 3, the attacking plane, traveling with velocity and direction represented by $\bar{V}_a$, fires its ammunition at point A in a direction intended to result in striking the target at the impact point C predicted by the computer. At the time of firing, the target is located at point B, and the instantaneous distance to the target is determined by the attacking plane's radar is represented by a range vector $\bar{r}$ having the indicated magnitude and direction. Let us assume that the target continues to fly until the explosion time with its velocity and direction constant at the values determined by the computer, or $\bar{V}_t T_f$. The further assumption will be made that the times of flight $T_f$ for target and ammunition are identical, but that the ammunition does not explode at the predicted point C, but at an actual explosion point D. It will be apparent that the distance between points C and D may be represented by a miss vector $\bar{M}$. The miss vector will be equal to the vectorial difference between the sum of $\bar{r}$ and $\bar{V}_t T_f$ and the product of the average ammunition velocity by the time to explosion, $\bar{V}_g T_f$. Stated in equation form, this is:

$$\bar{M} = \bar{r} + \bar{V}_t T_f - \bar{V}_g T_f \tag{1}$$

Rearranging and dividing Equation 1 by $T_f$, we have:

$$\frac{\bar{M}}{T_f} = \frac{\bar{r}}{T_f} + \bar{V}_t - \bar{V}_g \tag{2}$$

Now since $$\bar{V}_g = \bar{V}_a + \bar{V}_0 \tag{3}$$

where $\bar{V}_0$ is the average ammunition velocity relative to the fighter and $\bar{V}_a$ is the velocity of the fighter at the time of firing, we may substitute Equation 3 in Equation 2 and write:

$$\frac{\bar{M}}{T_f} = \frac{\bar{r}}{T_f} + \bar{V}_t - (\bar{V}_a + \bar{V}_0) \tag{4}$$

The motion of the target plane may also be expressed in terms of its vectorial velocity $V_a$ plus the rate of change of range, or:

$$\bar{V}_t = \bar{V}_a + \dot{\bar{r}} \tag{5}$$

Substituting in Equation 4 and dividing by $T_f$ gives:

$$\frac{\bar{M}}{T_f} = \frac{\bar{r}}{T_f} + (\bar{V}_a + \dot{\bar{r}}) - (\bar{V}_a + \bar{V}_0) \tag{6}$$

Rewriting the elements of Equation 6:

$$\frac{\bar{M}}{T_f} = \left(\frac{\bar{r}}{T_f} + \dot{\bar{r}}\right) - \bar{V}_0 \tag{7}$$

From the radar system we may derive $\bar{r}$ and $\dot{\bar{r}}$. The definition of $\bar{r}$ may be in terms of the unit vector, or the component of the vector along a particular axis. The radar data may be smoothed before entering the computer by vector filter means such as those described in the U.S. Patent to Shelley referred to above. The vector filter may be interconnected with radar 7 and computer 11 as indicated in FIG. 2 of Patent Number 2,805,022, with radar 1 and computer 8 corresponding respectively to radar 7 and computer 11 of this disclosure.

Let us next consider the radar range in terms of its components along the radar coordinate axes $i$, $j$, and $k$ and the angular turning rate $\omega$. Assuming that the attacking plane is properly directed, so that the $r_j$ and $r_k$ components or range are zero, as well as their rates of change:

$$\bar{r} = r_i \bar{1}_i \tag{8}$$

where $\bar{1}$ indicates the component of the preceding factor long the axis indicated by the subscript. Using this notation, and still holding $r_j$ and $r_k$ equal to zero, we may write the expression for the rate of change of $\bar{r}$ as:

$$\dot{\bar{r}} = \dot{r}_i \bar{1}_i + \omega r \tag{9}$$

The Equation 9 may be rewritten as:

$$\dot{\bar{r}} = \dot{r}_i \bar{1}_i + \begin{vmatrix} \bar{1}_i & \bar{1}_j & \bar{1}_k \\ \omega_i & \omega_j & \omega_k \\ r_i & r_j & r_k \end{vmatrix} \tag{10}$$

This becomes:

$$\dot{\bar{r}} = \dot{r}_i \bar{1}_i + r_i \begin{vmatrix} \bar{1}_j & \bar{1}_k \\ \omega_j & \omega_k \end{vmatrix} \tag{11}$$

Equation 11 may be reduced to the form $$\dot{\bar{r}} = \dot{r}_i \bar{1}_i + \omega_k r_i \bar{1}_j - \omega_j r_i \bar{1}_k \tag{12}$$

The values of $\omega_k$ and $\omega_j$ may be obtained directly from the antenna rate gyros in the radar system 7. Thus far the operations have been carried on in antenna coordinates.

The computer will next be called upon to solve the expression $$\frac{\bar{r}}{T_f} + \dot{\bar{r}}$$

of Equation 7. This may be stated as follows:

$$\frac{\bar{r}}{T_f} + \dot{\bar{r}} = \left(\frac{r_i}{T_f} + \dot{r}_i\right) \bar{1}_i + \omega_k r_i \bar{1}_j - \omega_j r_i \bar{1}_k \tag{13}$$

In order to effect a change of the data computed in antenna coordinates as above to values in airplane coordinates, in which ballistic information is furnished, we may apply the Euler transformations to Equation 13. We then have:

$$\begin{pmatrix} V_x \\ V_y \\ V_z \end{pmatrix} = \begin{pmatrix} \cos \eta & 0 & \sin \eta \\ 0 & 1 & 0 \\ -\sin \eta & 0 & \cos \eta \end{pmatrix} \begin{pmatrix} \cos \zeta & \sin \zeta & 0 \\ -\sin \zeta & \cos \zeta & 0 \\ 0 & 0 & 1 \end{pmatrix} \begin{pmatrix} V_i \\ V_j \\ V_k \end{pmatrix} \tag{14}$$

Carrying out the indicated operations, we have the following:

$$\begin{pmatrix} V_x \\ V_y \\ V_z \end{pmatrix} = \begin{pmatrix} \cos \eta \cos \zeta & \cos \eta \sin \zeta & \sin \eta \\ -\sin \zeta & \cos \zeta & 0 \\ -\sin \eta \cos \zeta & -\sin \eta \sin \zeta & \cos \eta \end{pmatrix} \begin{pmatrix} V_i \\ V_j \\ V_k \end{pmatrix} \tag{15}$$

The factors $\eta$ and $\zeta$ are supplied directly from angle resolvers on the antenna of the radar system. Multiplying out the expressions in Equation 13, we have the completed transformation from antenna to airplane coordinates in the forms:

$$V_x = \cos\eta \cos\zeta V_i + \cos\eta \sin\zeta V_j + \sin\eta V_k \quad (16)$$

$$V_y = -\sin\zeta V_i + \cos\zeta V_j \quad (17)$$

$$V_z = -\sin\eta \cos\zeta V_i - \sin\eta \sin\zeta V_j + \cos\eta V_k \quad (18)$$

From these equations we may derive in terms of airplane coordinates the following:

$$\frac{\bar{r}}{T_f} + \dot{r} = \left[ \cos\eta \cos\zeta \left(\frac{r_i}{T_f} + \dot{r}_i\right) \right.$$
$$\left. + \cos\eta \sin\zeta \omega_k r_i - \sin\eta \omega_j r_i \right] I_x$$
$$+ \left[ -\sin\zeta \left(\frac{r_i}{T_f} + \dot{r}_i\right) + \cos\zeta \omega_k r_i \right] I_y$$
$$+ \left[ -\sin\eta \cos\zeta \left(\frac{r_i}{T_f} + \dot{r}_i\right) - \sin\eta \sin\zeta \omega_k r_i - \cos\eta \omega_j r_i \right] I_z$$

$$(19)$$

The solution of the ballistic equations may then be carried out in the form $$\frac{M}{T_f} = \left(\frac{\bar{r}}{T_f} + \dot{r}\right) - \bar{V}_0 \quad (7)$$

Changing the vectorial form to that for the coordinates along the $x$, $y$, and $z$ axes, we have $$\frac{M_x}{T_f} = \left(\frac{\bar{r}}{T_f} + \dot{r}\right)_x - V_{0x} \quad (20)$$

$$\frac{M_y}{T_f} = \left(\frac{\bar{r}}{T_f} + \dot{r}\right)_y - V_{0y} \quad (21)$$

$$\frac{M_z}{T_f} = \left(\frac{\bar{r}}{T_f} + \dot{r}\right)_z - V_{0z} \quad (22)$$

Or:

$$\frac{M_x}{T_f} = \cos\eta \cos\zeta \left(\frac{r_i}{T_f} + \dot{r}_i\right)$$
$$+ \cos\eta \sin\zeta \omega_k r_i - \sin\eta \omega_j r_i - V_{0x} \quad (23)$$

$$\frac{M_y}{T_f} = -\sin\zeta \left(\frac{r_i}{T_f} + \dot{r}_i\right) + \cos\zeta \omega_k r_i - V_{0y} \quad (24)$$

$$\frac{M_z}{T_f} = \left[ -\sin\eta \cos\zeta \left(\frac{r_i}{T_f} + \dot{r}_i\right) - \sin\eta \sin\zeta \omega_k r_i - \cos\eta \omega_j r_i \right] - V_{0z} \quad (25)$$

In the equations above, we may represent the velocity components $V_{0x}$, $V_{0y}$ and $V_{0z}$ as being functions of the factors:

$$V_{0x} = F_1\left(T_f, \frac{P_s}{P_{s0}}, \theta, V_a\right) \quad (26)$$

$$V_{0y} = F_2\left(T_f, \frac{P_s}{P_{s0}}, \theta, V_a, \phi, \alpha\right) \quad (27)$$

$$V_{0z} = F_3\left(T_f, \frac{P_s}{P_{s0}}, \theta, V_a, \phi, \alpha\right) \quad (28)$$

The additional factors introduced in Equations 26, 27 and 28 are used in the computer 11 in solving the ballistics relations by known techniques. Substituting 26 in 23, we have:

$$\frac{M_x}{T_f} = \cos\eta \cos\zeta \left(\frac{r_i}{T_f} + \dot{r}_i\right) + \cos\eta \sin\zeta \omega_k r_i - \sin\eta \omega_j r_i$$
$$- F_1\left(T_f, \frac{P_s}{P_{s0}}, \theta, V_a\right) \quad (29)$$

If now we make $M_x = 0$, we may solve for $T_f$, the only unknown in Equation 29. Substituting 27 in 24, we have:

$$\frac{M_y}{T_f} = -\sin\zeta \left(\frac{r_i}{T_f} + \dot{r}_i\right) + \cos\zeta \omega_k r_i$$
$$- F_2\left(T_f, \frac{P_s}{P_{s0}}, \theta, V_a, \phi, \alpha\right) \quad (30)$$

Similarly substituting Equation 28 in Equation 25, we obtain:

$$\frac{M_z}{T_f} = -\sin\eta \cos\zeta \left(\frac{r_i}{T_f} + \dot{r}_i\right) - \sin\eta \sin\zeta \omega_k r_i - \cos\eta \omega_j r_i$$
$$- F_3\left(T_f, \frac{P_s}{P_{s0}}, \theta, V_a, \phi, \alpha\right) \quad (31)$$

The left-hand quantities in Equations 30 and 31 are now the only unknowns left, and are used to steer the airplane by being supplied as positioning factors to the optical sighthead.

Alternatively, as suggested above, if visual terminal conditions do not obtain, the positioning factors may be furnished to the pilot in the form of command signals to change the heading of the plane by a certain number of degrees in azimuth and elevation.

The invention thus provides the pilot with more accurate information for accomplishing his mission in a more readily usable form.

Although the invention has been described and illustrated in detail, it is to be clearly understood that the same is by way of illustration and example only and is not to be taken by way of limitation, the spirit and scope of this invention being limited only by the terms of the appended claims.

We claim:

1. The combination, in a fire control system, of an optical gunsight means having a projected reticle display; means associated with said gunsight means for indicating the deviation of an attacking airborne vehicle from a desired path toward a target; radiant energy detecting means providing direction signals indicating the relative azimuth and elevation of said target from said airborne attacking vehicle; means for determining the present course and predicting the future position of said target to provide error signals; and means responsive to said determining and predicting means and to said radiant energy detecting means; for displacing the projected reticle image of said optical gunsight means by computed amounts according to the difference between said direction and error signals.

2. The combination in a fire control system of an optical gunsight means having a projected reticle display; radiant energy detecting means providing line of sight signals indicating the relative azimuth and elevation of a target from said fire control system; director computing means for providing course error signals; means responsive to said determining and predicting means and to said radiant energy detecting means for displacing the projected reticle of said optical gunsight means in accordance with the difference between said signals.

3. In a fire control system adapted to be used in an attacking vehicle: optical tracking means permitting the direct view tracking of a target; a tracking radar for determining line of sight of the target; means responsive to the radar for computing the present position and predicting the future position of said target; means responsive to said computing means and to said radar for angularly disturbing off the position of said optical tracking means in accordance with the present and predicted positions of the target and the output of said radar; whereby when a pilot controls the vehicle so that said optical tracking means are maintained centered on said target, the attacking vehicle is guided along a course in which the armament thereof when fired will intercept said target.

4. In a fire control system adapted to be used in an attacking aircraft, the combination of: means for optically tracking said target; radiant energy means for tracking said target; computing means and servo control for calculating a desired course; means for disturbing the line of sight of said optical tracking means in accordance with instructions from said computing means and said radiant energy means.

5. A fire control system for use in aircraft for computing the proper course to be taken by said aircraft so that it can intercept a target, said system including a self-tracking radar, said radar having a radar antenna controlled in position by said radar for receiving and transmitting radiation signals, a director fire control computer connected to receive data from said radar for generating aircraft steering error signals, position detecting means connected to said antenna for generating signals indicative of the position of said antenna, a summing device connected to algebraically sum the output of said computer and the output of said position detecting means, an optical display device, and a servo controller responsive to the output of said summing device for controlling said optical display device to enable said aircraft to be flown by a pilot to reduce said aircraft steering error to zero.

6. A fire control system comprising tracking radar means for producing range and direction signals representative of range and direction of a target, computer means responsive to said radar signals for producing a lead signal representing a computed lead angle, an optical sighting device, and means for positioning said sighting device in accordance with the algebraic sum of said lead and direction signals.

References Cited in the file of this patent
UNITED STATES PATENTS

| | | |
|---|---|---|
| 2,467,831 | Johnson | Apr. 19, 1949 |
| 2,616,625 | Griest | Nov. 4, 1952 |
| 2,704,490 | Hammond | Mar. 22, 1955 |
| 2,715,776 | Knowles et al. | Aug. 23, 1955 |
| 2,933,980 | Moore et al. | Apr. 26, 1960 |
| 2,949,808 | Thurow | Aug. 23, 1960 |

UNITED STATES PATENT OFFICE
CERTIFICATE OF CORRECTION

Patent No. 3,075,188                        January 22, 1963

Rulon G. Shelley et al.

It is hereby certified that error appears in the above numbered patent requiring correction and that the said Letters Patent should read as corrected below.

Column 5, line 36, for "is", first occurrence, read -- as --; column 7, line 35, equation "(21)" for that portion of the equation reading $\dfrac{M_y}{|T_f}$ read $\dfrac{M_y}{T_f}$ column 8, line 65, for "of", second occurrence, read -- to --.

Signed and sealed this 7th day of April 1964.

(SEAL)
Attest:

ERNEST W. SWIDER

Attesting Officer

EDWARD J. BRENNER

Commissioner of Patents